United States Patent
Ricks

(10) Patent No.: US 11,933,641 B2
(45) Date of Patent: Mar. 19, 2024

(54) POSITION DETECTION APPARATUS, METHOD, AND SYSTEM UTILIZING AN ARRAY OF MAGNETIC SENSORS EACH COMPRISING A SENSOR SIGNAL CONDITIONING CIRCUIT

(71) Applicant: Honeywell International Inc., Morris Plains, NJ (US)

(72) Inventor: Lamar Floyd Ricks, Westerville, OH (US)

(73) Assignee: Honeywell International Inc., Morris Plains, NJ (US)

(*) Notice: Subject to any disclaimer, the term of this patent is extended or adjusted under 35 U.S.C. 154(b) by 204 days.

(21) Appl. No.: 16/743,873

(22) Filed: Jan. 15, 2020

(65) Prior Publication Data

US 2021/0215510 A1 Jul. 15, 2021

(51) Int. Cl.
*G01D 5/16* (2006.01)

(52) U.S. Cl.
CPC .................................... *G01D 5/16* (2013.01)

(58) Field of Classification Search
CPC ........................................................ G01D 5/16
See application file for complete search history.

(56) References Cited

U.S. PATENT DOCUMENTS

| 5,589,769 | A | 12/1996 | Krahn |
| 6,097,183 | A | 8/2000 | Goetz et al. |
| 7,030,604 | B1 | 4/2006 | Dmytriw et al. |
| 7,112,962 | B2 | 9/2006 | Ricks et al. |
| 7,173,414 | B2 | 2/2007 | Ricks et al. |
| 7,408,343 | B2 | 8/2008 | Dmytriw et al. |
| 7,859,255 | B2 | 12/2010 | Doogue et al. |
| 8,018,223 | B2 | 9/2011 | Latoria et al. |
| 8,180,585 | B2 | 5/2012 | Cech et al. |
| 8,723,511 | B2 * | 5/2014 | Robinson .............. G01D 5/2452 324/207.22 |
| 9,018,941 | B2 * | 4/2015 | Pozzati .................. B82Y 25/00 324/202 |
| 9,297,634 | B2 * | 3/2016 | Bartos ..................... G01D 5/145 |
| 2013/0200887 | A1 | 8/2013 | Bartos et al. |
| 2017/0089940 | A1 | 3/2017 | Bussan et al. |
| 2020/0326209 | A1 * | 10/2020 | Houfburg ................. G01D 5/20 |
| 2020/0327090 | A1 * | 10/2020 | Voss ..................... G06F 13/4256 |

OTHER PUBLICATIONS

Combined Search and Examination Report issued in United Kingdom Application No. 2100205.0, dated Jul. 7, 2021, 3 pages.

* cited by examiner

*Primary Examiner* — Walter L Lindsay, Jr.
*Assistant Examiner* — Milton Gonzalez
(74) *Attorney, Agent, or Firm* — Alston & Bird LLP

(57) ABSTRACT

An apparatus, method, and associated systems are provided. A plurality of anisotropic magnetoresistive sensors are arranged in an array, each anisotropic magnetoresistive sensor comprising a magnetic field transducer and a sensor signal conditioning circuit. A central processor in electrical communication with each anisotropic magnetoresistive sensor is provided. The central processor is configured to compare processed signals received from at least two of the plurality of anisotropic magnetoresistive sensors to determine a position of the magnet.

18 Claims, 9 Drawing Sheets

POSITION DETECTION APPARATUS, METHOD, AND SYSTEM UTILIZING AN ARRAY OF MAGNETIC SENSORS EACH COMPRISING A SENSOR SIGNAL CONDITIONING CIRCUIT

TECHNOLOGICAL FIELD

An example embodiment relates generally to a position detection apparatus, and, more particularly, to apparatus and techniques for determining a position of a magnet.

BACKGROUND

Magnetoresistive (MR) array technology is utilized in a variety of commercial, consumer and industrial detection applications. In some MR systems, an apparatus may be provided for determining the position of a member movable along a path. In such a device, a magnet may be attached to the movable member and an array of magnetic field transducers are located adjacent the path. As the magnet approaches, passes and moves away from a transducer, the transducer provides a varying output signal, which may be represented by a single characteristic curve that is representative of any of the transducers.

One example of a conventional magnetic sensing approach is disclosed, for example, in U.S. Pat. No. 5,589,769, "Position Detection Apparatus Including a Circuit for Receiving a Plurality of Output Signal Values and Fitting the Output Signal Values to a Curve," which issued to Donald R. Krahn on Dec. 31, 1996, and is assigned to Honeywell International Inc. As shown in FIG. 4 of the '769 patent, this device operated using a plurality of transducers connected to a single analog/digital converter and a single processor via a multiplexer.

Conventional apparatus and methods for position detection exhibit a plurality of limitations. Through applied effort, ingenuity, and innovation, solutions and improvements have been realized and are described in connection with embodiments of the present invention.

BRIEF SUMMARY

A position detection apparatus and associated systems and methods are disclosed for determining a position of a magnet, such as a magnet movable along a path. By utilizing the inventions described herein, including, but not limited to, a dedicated sensor signal conditioning circuit for each anisotropic magnetoresistive (AMR) sensor in an array, a faster and more efficient approach to position detection is provided compared to conventional systems, methods, and apparatus. For example, benefits of this design include reduced warm up time, faster response time, reduced power consumption, significantly increased output resolution of the AMR sensor array, and updating and/or polling of the AMR sensors in or near parallel.

In one example embodiment, a position detection apparatus is provided. The position detection apparatus comprises a plurality of anisotropic magnetoresistive sensors arranged in an array. Each anisotropic magnetoresistive sensor comprises a magnetic field transducer comprising magnetoresistive material and configured to provide an output signal based on an interaction between the magnetic field transducer and a magnet. Each anisotropic magnetoresistive sensor further comprises a sensor signal conditioning circuit configured to receive the output signal and generate processed digital position data. The position detection apparatus further comprises a central processor in electrical communication with each anisotropic magnetoresistive sensor, wherein the central processor is configured to receive and compare the processed digital position data from at least two of the plurality of anisotropic magnetoresistive sensors to determine a position of the magnet.

In some embodiments of the position detection apparatus, each sensor signal conditioning circuit comprises a converter configured to convert the received output signal into digital position data before generating the processed digital position data. In some embodiments, each sensor signal conditioning circuit comprises a processor configured to process the digital position data to generate the processed digital position data. In some embodiments, the digital position data comprises errors associated with at least one of an offset error, a sensitivity/gain error, a thermal effect on offset error, or a thermal effect on sensitivity/gain error. In some embodiments, processing the digital position data comprises compensation of one or more of the errors. In some embodiments, the array is configured on a printed circuit board (PCB). In some embodiments of the position detection apparatus, the plurality of anisotropic magnetoresistive sensors and the central processor are configured to be electrically powered at different operating voltages. In some embodiments, the plurality of anisotropic magnetoresistive sensors are configured to be electrically powered at a lower operating voltage than the operating voltage of the central processor. In some embodiments, no multiplexer is present between the plurality of anisotropic magnetoresistive sensors and the central processor, and wherein the central processor is configured to address the plurality of anisotropic magnetoresistive sensors in parallel or near parallel.

In a further example embodiment, a method of position detection is provided. The method comprises arranging a plurality of anisotropic magnetoresistive sensors in an array, wherein each anisotropic magnetoresistive sensor comprises a magnetic field transducer comprising magnetoresistive material, the magnetic field transducer configured to provide an output signal based on an interaction between the magnetic field transducer and a magnet and a sensor signal conditioning circuit configured to receive the output signal and generate processed digital position data. The method further comprises providing a central processor in electrical communication with each anisotropic magnetoresistive sensor, wherein the central processor is configured to compare the processed digital position data from at least two of the plurality of anisotropic magnetoresistive sensors to determine a position of the magnet.

In some embodiments of the method, each sensor signal conditioning circuit comprises a converter configured to convert the received output signal into digital position data before generating the processed digital position data. In some embodiments, each sensor signal conditioning circuit comprises a processor configured to process the digital position data to generate the processed digital position data. In some embodiments, the digital position data comprises errors associated with at least one of an offset error, a sensitivity/gain error, a thermal effect on offset error, or a thermal effect on sensitivity error. In some embodiments of the method, processing the digital position data comprises compensation of one or more of the errors. In some embodiments of the method, the array is configured on a printed circuit board (PCB). In some embodiments of the method, the plurality of anisotropic magnetoresistive sensors and the central processor are configured to be electrically powered at different operating voltages. In some embodiments, the plurality of anisotropic magnetoresistive sensors are configured to be electrically powered at a lower operating voltage than the operating voltage of the central processor. In some embodiments, no multiplexer is present between the plurality of anisotropic magnetoresistive sensors and the central processor, and wherein the central processor is configured to address the plurality of anisotropic magnetoresistive sensors in parallel or near parallel. In some embodiments, the magnetic field transducer comprises a Wheatstone bridge circuit.

BRIEF DESCRIPTION OF THE DRAWINGS

Figure 1:
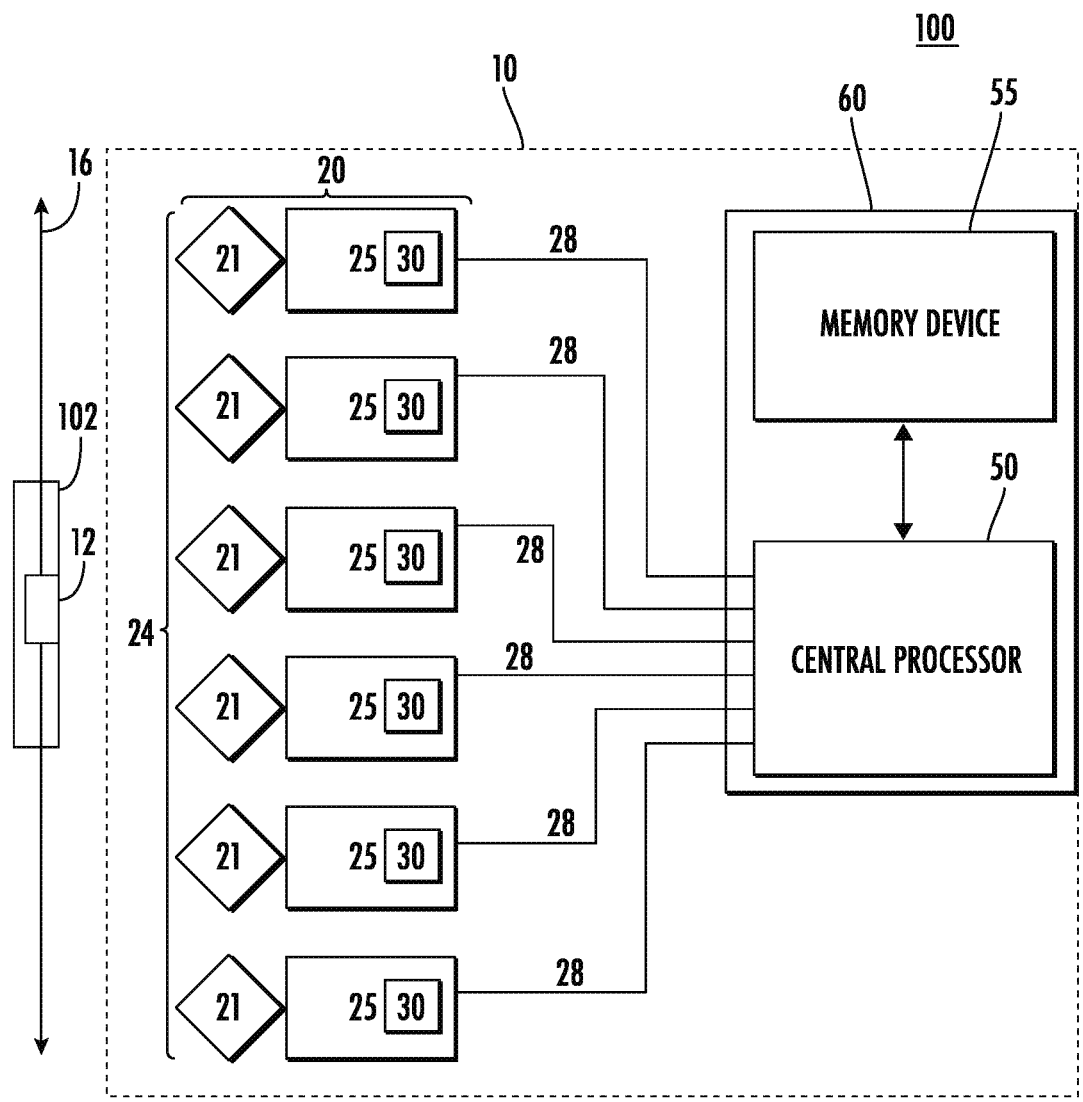
Figure 2:
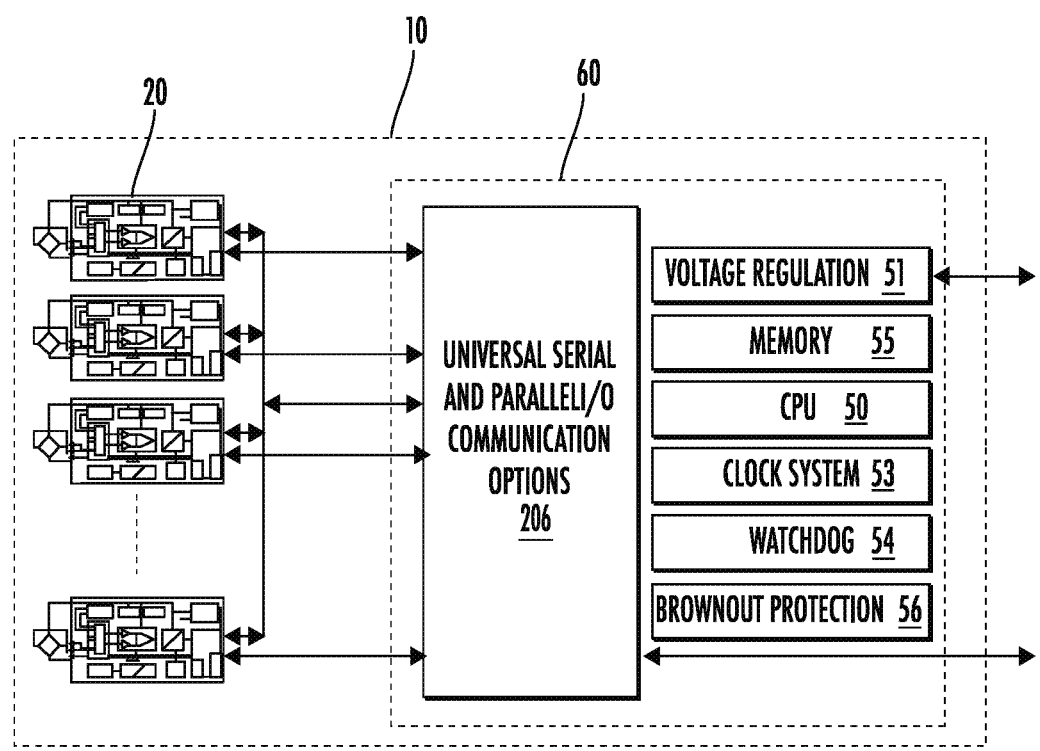
Figure 3:
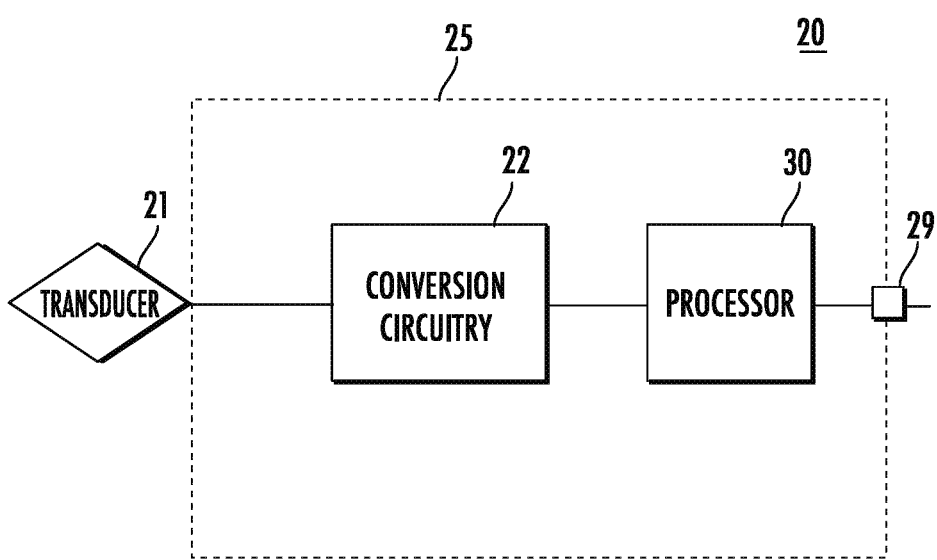
Figure 4:
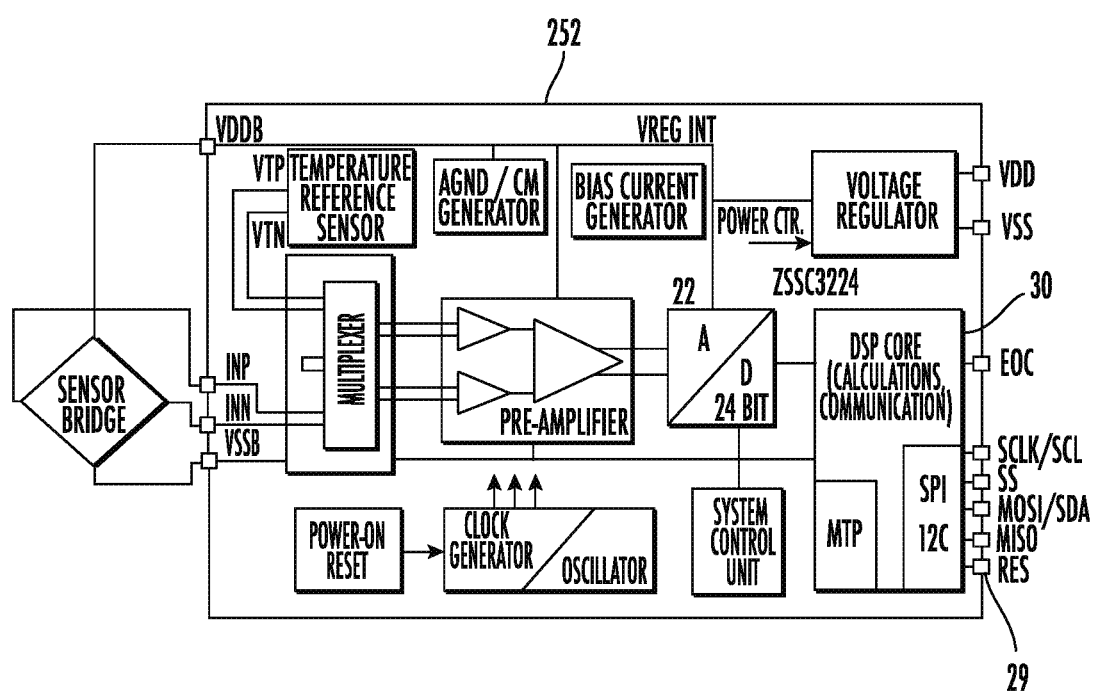
Figure 5:
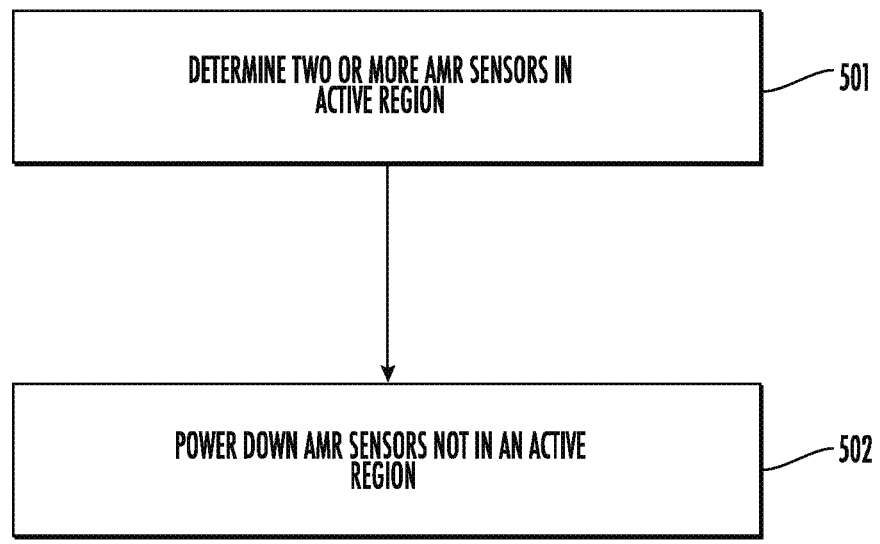
Figure 6:
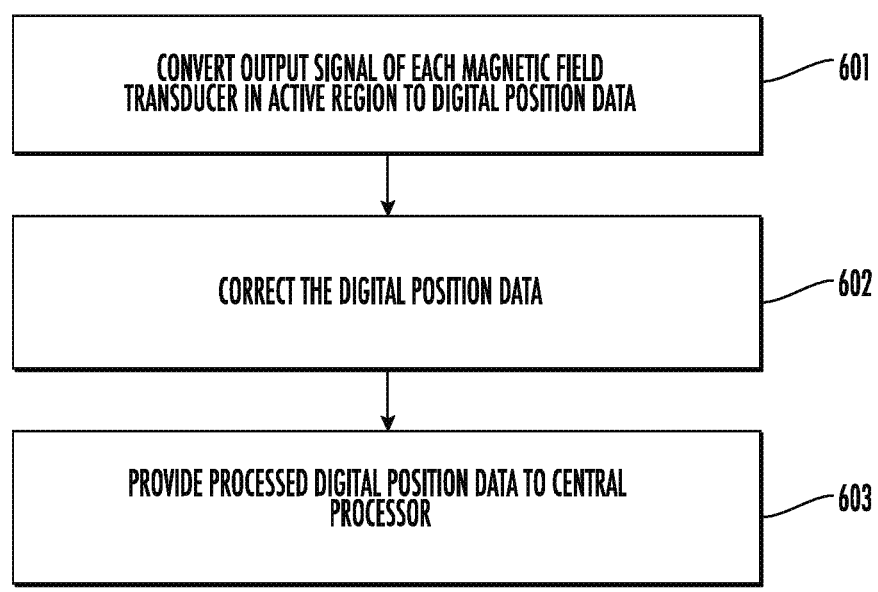
Figure 7:
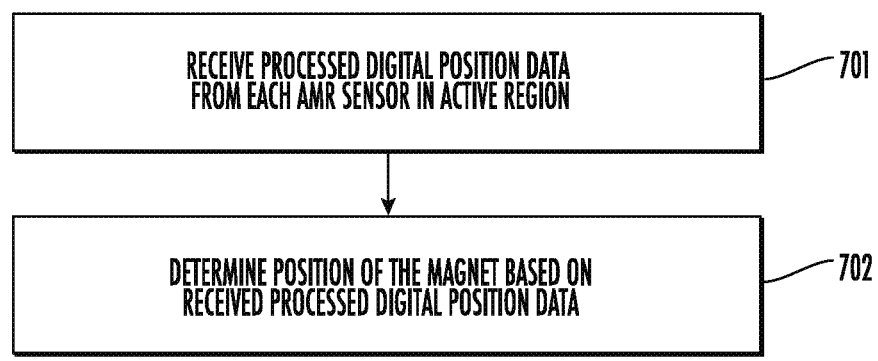
Figure 8:
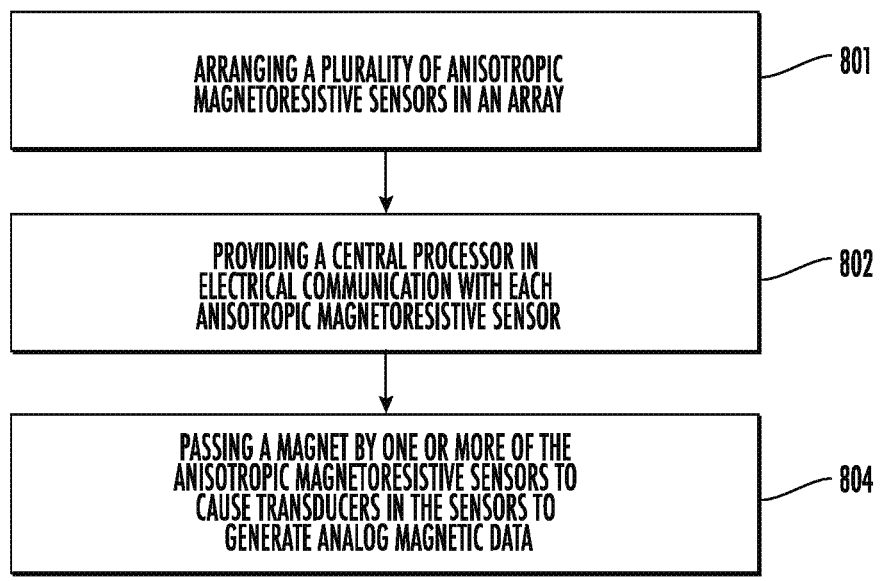
Figure 9:
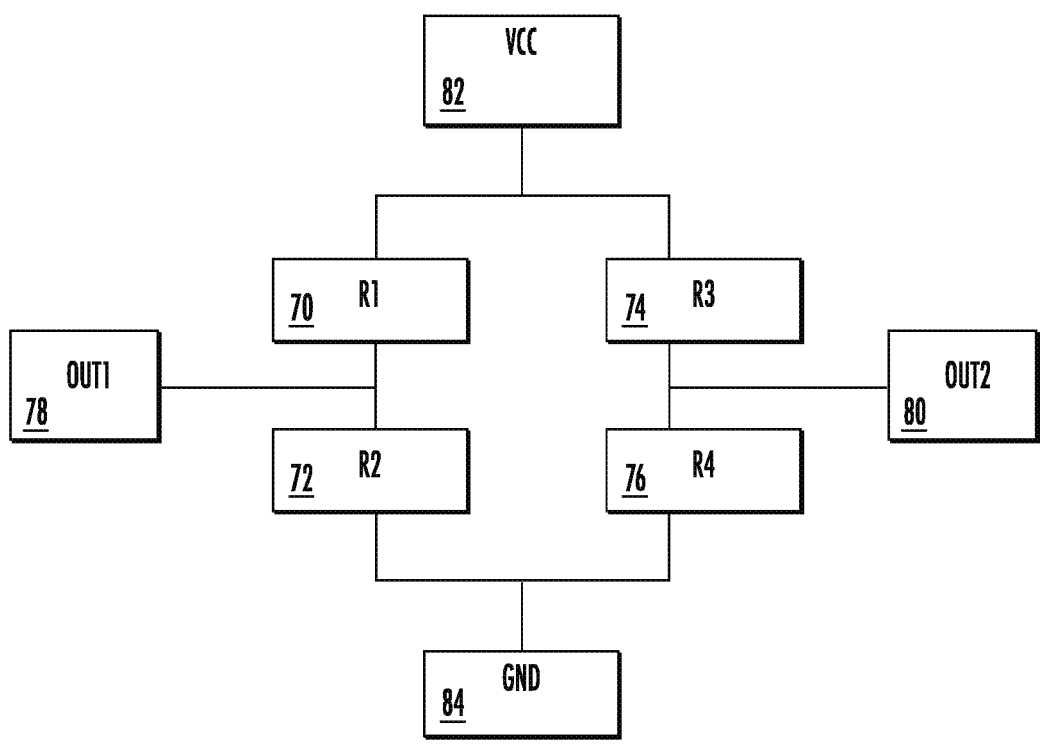

Having thus described certain example embodiments of the present disclosure in general terms, reference will hereinafter be made to the accompanying drawings, which are not necessarily drawn to scale, and wherein:

FIG. 1 is a block diagram of a position detection apparatus configured in accordance with an example embodiment of the present disclosure;

FIG. 2 is a block diagram of a position detection apparatus configured in accordance with an example embodiment of the present disclosure;

FIG. 3 is a block diagram of a sensor signal conditioning circuit that may be specifically configured in accordance with an example embodiment of the present disclosure;

FIG. 4 is a block diagram of a sensor signal conditioning circuit that may be specifically configured in accordance with an example embodiment of the present disclosure;

FIG. 5 is a flowchart illustrating operations performed in accordance with an example embodiment;

FIG. 6 is a flowchart illustrating operations performed in accordance with an example embodiment;

FIG. 7 is a flowchart illustrating operations performed in accordance with an example embodiment;

FIG. 8 is a flowchart illustrating operations performed in accordance with an example embodiment; and FIG. 9 is a block diagram of a transducer in accordance with an example embodiment.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term "circuitry" refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of "circuitry" applies to all uses of this term herein, including in any claims. As a further example, as used herein, the term "circuitry" also includes an implementation comprising one or more processors and/or portion(s) thereof and accompanying software and/or firmware. As another example, the term "circuitry" as used herein also includes, for example, a baseband integrated circuit or applications processor integrated circuit for a mobile phone or a similar integrated circuit in a server, a cellular network device, other network device (such as a core network apparatus), field programmable gate array, and/or other computing device. Additionally, as used herein, the term 'module' refers to hardware or a combination of hardware and software in which the execution of the software directs operation of the hardware.

As described above, MR systems designed for position detection may utilize individual bridges all electrically connected downstream to a discrete multiplexer, the output of which is further connected to a discrete analog-to-digital (AD) converter electrically connected to a microprocessor. However, there may be numerous challenges associated with these prior configurations. For example, by utilizing a discrete multiplexer and a discrete AD converter, all bridges must be polled individually (e.g., serially) in order to determine the location of a magnet of interest and to determine which bridges are in an active region (e.g., which bridges are interacting with a magnetic field given off by the magnet such that the bridges are providing an output signal). In some embodiments, the "active region" may be defined as the area adjacent the two closest transducers to the magnet. MR systems and methods may also account for common mode variations between bridges, such as gain and span, purely through mathematical expressions conducted at the single microprocessor. This may be insufficient, as bridges next to each other in the array may have considerable variation. For example, bridges may be from different wafer lots and the sensitivity (e.g., span) and the thermal effect on sensitivity of each bridge may be radically different. Additionally, by utilizing a central, discrete AD converter and a single processor, sensor response time is slower due to bridge signals being processed alternately in a serial fashion. Further, a discrete multiplexer and discrete AD converter limits the potential resolution of the array of sensors.

FIG. 1 illustrates an overview of a position detection apparatus 100, which is described for general illustrative purposes and to depict the context in which some embodiments may be implemented. In an embodiment, components of the position detection apparatus may be configured on one or more printed circuit boards (PCB) 10. An array 24 of anisotropic magnetoresistive (AMR) sensors 20 includes magnetic field transducers 21 (e.g., AMR bridges) arranged in a linear array 24 parallel to a longitudinal axis with magnetic field transducers 21 spaced a known distance apart. In an embodiment, the magnetic field transducers 21 may comprise a magnetoresistive material, e.g., permalloy strips connected in a bridge arrangement (e.g., a Wheatstone bridge circuit), operating in a magnetic field strong enough to saturate the permalloy strips. Under these conditions, the resistance change of the permalloy strips is a measure of the angle of the magnetization and therefore a measure of the angle of the magnetic field. In the depicted embodiment, a magnet 12 provides a magnetic field and moves along a predefined path 16 and the magnetic field from the magnet 12 also moves along array 24. In this regard, the magnet 12 may be attached to a moving object 102 (e.g., an elevator, valve, steering rack, or other type of equipment whose position is intended to be detected). Magnetic field transducers 21 may be designed to be sensitive to a magnetic field component in a single direction or to be sensitive to magnetic field components in a combination of directions. Each magnetic field transducer 21 generates magnetic field data (e.g., an analog signal) when magnet 12 is in proximity to the respective magnetic field transducer and may be configured to provide an output signal based on the received magnetic field. Although six AMR sensors 20 are depicted in FIG. 1, the array 24 may be configured with additional or fewer AMR sensors (e.g., at least two AMR sensors), depending upon design, application, and/or other considerations. In some embodiments, the position detection apparatus 100 may be configured to determine an absolute position of a magnet 12 relative to the apparatus.

One example of a magnetic field transducer 21 is shown in the Wheatstone bridge illustrated in FIG. 9. In the depicted embodiment, the transducer 21 four resistors 70, 72, 74, 76 arranged in parallel circuits. A first circuit connects two resistors 70, 72 with the voltage at the common collector (VCC) 82, the ground 84, and a first output 78, and a second circuit connects two resistors 74, 76 with the voltage at the VCC 82, the ground 84, and a second output 80. The outputs may then be fed into the sensor signal conditioning circuit 25 as described herein.

Referring back to FIG. 1, each AMR sensor 20 in the array 24 further comprises a sensor signal conditioning circuit 25. In some embodiments, each sensor signal conditioning circuit 25 may be configured to receive an output signal from the magnetic field transducer 21 of the respective AMR sensor 20. For example, in some embodiments, each sensor signal conditioning circuit 25 may comprise conversion circuitry which may be configured receive an analog output signal (also referred to as the magnetic field data) from a respective magnetic field transducer 21 and convert the received output signal into digital position data. In some embodiments, the conversion circuitry may use a preamplifier or Programmable Gain Amplifier (PGA) stage to allow some amplification of the input sensor element signal before it is digitized. In some embodiments, the sensor signal conditioning circuit 25 may further comprise a processor 30 and the conversion circuitry may be further configured to transmit the digital position data to the processor 30 of the particular AMR sensor 20.

For example, the processor 30 may be configured to receive the digital position data from the conversion circuitry and process the digital position data. In some embodiments, processing of the digital position data may comprise compensation and/or correction of errors associated with the digital position data. In some embodiments, processors 30 may be lower-power and lower-performance processors suitably configured and/or programmed to use one or more algorithms to process digital position data, including but not limited to error compensation and/or correction of the digital position data. In some embodiments, each AMR sensor 20 may be calibrated before or after assembly into the completed apparatus 100. For example, a magnetic field transducer 21 (e.g., an AMR bridge) and sensor signal conditioning circuit 25 may be packaged into a JEDEC standard microelectronic surface mount package such as an 8-pin SOIC, or similar. The sensor package may be run across a EOL Tester that had magnetic and temperature capability and each sensor 20 may be calibrated for its own unique characteristics. In some embodiments, each sensor 20 may thus be pre-calibrated before being assembled together in final array form, and in the event magnetic field transducers 21 from completely different wafer lots having different film properties and magnetic sensitivities were packaged together in the same array, it will not cause any additional overall performance errors because the sensor signal conditioning circuit and magnetic and thermal calibration has taken care of all of these potential errors ahead of time.

Each AMR sensor 20 may be electrically connected (also referred to as being in electrical communication) with a central processor 50, which may be one or more parts of a processing circuit 60. For example, each AMR sensor 20 may be electrically connected to the central processor 50 via a respective conductor 28 and configured to transmit data, such as processed (e.g., compensated and/or corrected) digital position data, to the central processor 50. In some embodiments, the digital position data may be provided at one or more digital output pins of the AMR sensor 20 and the transmission of the processed digital position data from the AMR sensor 20 to the central processor 50 may be in accordance with a digital communication protocol, such as Inter-Integrated Circuit (I2C), Serial Peripheral Interface (SPI), Single Edge Nibble Transmission (SENT), and/or the like. In some embodiments, the sensors 20 may be directly connected to the central processor 50 via conductors 28 with no intervening circuitry or components.

Central processor 50 may be suitably configured and/or programmed to execute functions associated with determining a position of the magnet that may include periodically scanning (e.g., polling) the outputs of each sensor 20 to obtain data, selecting and/or determining two or more sensors and transducers having an output that indicates relative proximity to the magnet 12, receiving data, such as processed digital position data from one or more AMR sensors 20, and/or the like. In this regard, the central processor 50 may comprise one or more Coordinate Rotation Digital Computer (CORDIC) algorithms and/or the like for determining position of a magnet 12 based on received processed digital position data from two or more of the sensors 20.

In some embodiments, the central processor 50 may be in communication with a memory device 55 via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the central processor 50). The memory device 55 may be configured to store information, data, content, applications, instructions, or the like for enabling the position detection apparatus 100 to carry out various functions in accordance with example embodiments of the present disclosure. For example, the memory device 55 may be configured to store digital position data for processing by the central processor 50. Additionally, or alternatively, the memory device 55 may be configured to store instructions for execution by the central processor 50, such as instructions associated with determining a position of a magnet 12 and/or the like. In some embodiments, the apparatus 100 may be in communication (e.g., wired or wireless communication) with one or more computing devices to facilitate the use and operation of one or more systems based on the captured sensor data as would be understood by a person of ordinary skill in the art in light of the present disclosure. To facilitate such communication, the apparatus 100 may include one or more control and/or communication components (e.g., a transmitter or the like) for transmitting signals via one or more wired or wireless protocols (e.g., Wi-Fi, Bluetooth, Ethernet, Controller Area Network (CAN), Local Interconnect Network (LIN), TCP/IP, or the like).

The central processor 50 may be embodied in a number of different ways. For example, the central processor 50 may be embodied as one or more of various hardware processing means such as one or more coprocessors, microprocessors, controllers, digital signal processors (DSP), processing elements with or without an accompanying DSP, or various other circuitry including integrated circuits such as, for example, ASICs (application specific integrated circuit), FPGAs (field programmable gate array), microcontroller units (MCU), hardware accelerators, special-purpose computer chips, or the like. As such, in some embodiments, the central processor 50 may include one or more processing cores configured to perform independently. A multi-core central processor 50 may enable multiprocessing within a single physical package. In some embodiments, the central processor 50 may be embodied as a single processor. Additionally, or alternatively, the central processor 50 may include one or more processors configured in tandem via the bus to enable independent execution of instructions, pipelining and/or multithreading.

In an example embodiment, the central processor 50 may be configured to execute instructions stored in the memory device 55 or otherwise accessible to the central processor. Alternatively, or additionally, the central processor 50 may be configured to execute hard-coded functionality. As such, whether configured by hardware or software methods, or by a combination thereof, the central processor 50 may represent an entity (e.g., physically embodied in circuitry) capable of performing operations according to an embodiment of the present disclosure while configured accordingly. Thus, for example, when the central processor 50 is embodied as an ASIC, FPGA or the like, the processing circuitry may be specifically configured hardware for conducting the operations described herein. Alternatively, as another example, when the central processor 50 is embodied as an executor of instructions, the instructions may specifically configure the central processor to perform the algorithms and/or operations described herein when the instructions are executed. However, in some cases, the central processor 50 may be a processor of a specific device configured to employ an embodiment of the present invention by further configuration of the central processor by instructions for performing the algorithms and/or operations described herein. The central processor 50 may include, among other things, a clock, an arithmetic logic unit (ALU) and logic gates configured to support operation of the processing circuitry.

FIG. 2 shows another example view of a position detection apparatus 100 which may, in some embodiments, be configured on a PCB 10 along with an embodiment of the processing circuit 60. As shown in FIG. 2, in some embodiments, the processing circuit 60 may comprise one or more modules including a voltage regulation module 51, a memory module, such as memory device 55 described above, a central processing unit (CPU) module, such as processor 50 described above, a clock system module 53, a watchdog module 54, and a brownout protection module 56. The processing circuit 60 may also comprise a communication interface 206 comprising, in some embodiments, universal serial and parallel input and output communication options.

The communication interface 206 may be any means, such as a device or circuitry embodied in either hardware or a combination of hardware and software, that is configured to receive and/or transmit data, such as digital position data and/or the like. In an example embodiment, the communication interface 206 may be configured to receive digital position data from one or more AMR sensors 20. In this regard, the communication interface 206 may include, for example, an antenna (or multiple antennas), ports, or communications devices and supporting hardware and/or software for enabling communications (e.g., with a communication network using any of the protocols and techniques discussed herein or known in the art). Additionally, or alternatively, the communication interface 206 may include the circuitry for interacting with the ports and/or antenna(s) to cause transmission of signals via the ports and/or antenna(s) or to handle receipt of signals, digital position data, and/or the like received via the ports and/or the antenna(s). In some environments, the communication interface 206 may alternatively or also support wired communication. As such, for example, the communication 206 interface may include a communication modem and/or other hardware/software for supporting communication via cable, universal serial bus (USB) or other mechanisms and protocols described herein or known in the art.

In some embodiments, the processing circuit 60 may comprise a voltage regulation module 51 configured to maintain a constant voltage level of power supplied to the processing circuit 60, the sensors 20, and/or the various components therein. For example, in some embodiments, the array 24 of AMR sensors 20 may be configured to be operated at an independent supply voltage from the processing circuit 60 and the central processor 50. For example, the position detection apparatus 100 may be configured to be supplied with 12.0 volts direct current (VDC) regulated supply while each of the individual AMR sensors may be powered with 1.8 VDC, thus significantly reducing the power consumption of the position detection apparatus 100. In some embodiments, the sensors 20 may operate using about 1.70 VDC to about 3.60 VDC. In some instances, such as an automobile, a clean regulated 5.0 VDC supply may be provided to the sensors and this may exceed the capabilities of the AMR sensors 20. In some embodiments, the sensors 20 and apparatus 100 may comprise circuitry to handle overvoltage, reverse voltage, load dump and can operate to high supply voltages. In some embodiments, the sensors 20 and apparatus 100 may be optimized for low power consumption and the sensors 20 may have a sleep mode as described herein. To optimize the system performance and minimize overall power consumption, in some embodiments, the processing circuitry 60 may control power regulation and may handle voltage regulation for each of the sensors 20.

As described herein, in some MR methods, a master microprocessor with a discrete AD converter has been utilized and, in order to maximize performance and avoid errors in the circuit, the same reference voltage is applied to AMR bridges, microprocessor, and the discrete AD converter. For example, this may be because the analog signal must be transmitted all the way to a common AD converter, and analog circuits may require a common voltage to avoid inducing errors in the data (e.g., each sensor and the single microprocessor may require the same, higher reference voltage of the single microprocessor). In contrast, present embodiments may separate the voltage dependency of the AMR sensors 20 and central processor 50 in order to provide, among other benefits described further herein, more flexibility to the overall design of the position detection apparatus 100.

The central processor 50 may further comprise a clock system 53 configured to regulate the rate at which instructions are executed at the central processor (e.g., by processor 50). In some embodiments, the central processor 50 may further comprise a watchdog module 54 (e.g., a watchdog timer) configured to detect and recover from potential malfunctions of the position detection apparatus 100. In some embodiments, the central processor 50 may further comprise a brownout protection module 56 configured to cause the central processor 50 to reset (e.g., reboot) in the event of a brownout and/or other significant drop in power supply.

FIG. 3 illustrates an example overview of an AMR sensor 20 and one embodiment of a sensor signal conditioning circuit 25 in accordance with one embodiment. As described above, the AMR sensor 20 may comprise a magnetic field transducer 21 configured to provide an output signal based on an interaction between the magnetic field transducer 21 and a magnet 12 (shown in FIG. 1). In an embodiment, magnetic field transducer 21 may comprise magnetoresistive material connected in a bridge arrangement (e.g., a full-bridge or a half-bridge), such as a Wheatstone bridge circuit. In some embodiments, the sensor signal conditioning circuitry 25 may be configured to receive a single-ended voltage signal from a half-bridge sensor, and in such embodiments, a second input of the ADC may be connected to a known reference voltage. The magnetic field transducer 21 may be configured to be sensitive to a magnetic field and receive magnetic field data (also referred to as an analog signal) when a magnet 12 is in proximity to the magnetic field transducer and may be further configured to provide an output signal based on the received magnetic field data. The AMR sensor 20 further comprises a sensor signal conditioning circuit 25.

In the depicted embodiment, sensor signal conditioning circuit 25 comprises conversion circuitry 22 which may be configured receive an analog output signal from the magnetic field transducer 21 and convert the received output signal into digital position data. In some embodiments, the conversion circuitry 22 may also perform one or more intermediate functions required to prepare the data for processing as would be understood by a person of ordinary skill in the art in light of the present disclosure. In some embodiments, the sensor signal conditioning circuit 25 may further comprise a processor 30 and the conversion circuitry 22 may be further configured to transmit the digital position data to the processor 30 of the AMR sensor 20. The processor 30 may be any of the processors described herein with respect to the AMR sensor 20.

As described herein, the processor 30 may be configured to receive the digital position data from the conversion circuitry 22 and specially process the digital position data prior to transmission of the digital position data to a central processor 50. In some embodiments, processing of the digital position data by the processor 30 may comprise compensation and/or correction of errors associated with the digital position data. For example, during a manufacturing process, magnetic transducers 21 may be calibrated, via the dedicated sensor signal conditioning circuits 25, to a set of reference conditions at a particular reference temperature (e.g., room temperature). This may refer to an offset error calibration and/or a sensitivity (e.g., gain, sensitivity, or span error). The transducers 21 may also be calibrated for how the errors vary with temperature. For example, digital position data received at the processor 30 may comprise errors such as, but not limited to, errors associated with an individual offset error, a sensitivity error, a thermal effect on offset error, and/or a thermal effect on sensitivity error. These errors may be compensated for by the sensor signal conditioning circuits 25 and/or by the processing circuit 60.

Offset error may refer to the maximum deviation in measure offset at reference temperature relative to a target (e.g., ideal) offset. The ideal offset may be based upon an ideal transfer function. A thermal coefficient of offset may refer to an amount of offset change occurring over a specified temperature change. A thermal effect on offset may refer to a maximum deviation in offset due to changes in temperature over a compensated temperature range, relative to offset measured at a reference temperature. Sensitivity error (e.g., span error or gain error) may refer to the maximum deviation in measured full scale span at a reference temperature relative to a target full scale span. A thermal coefficient of span may refer to a thermal effect on span expressed as an amount of span change occurring over a specified temperature change. A thermal effect on span may refer to a maximum deviation in full scale span due to changes in temperature over a compensated temperature range, relative to full scale span measured at reference temperature.

In this regard, the output of each magnetic field transducer 21 may be individually compensated and/or corrected for a unique offset, sensitivity, thermal effect on offset and/or thermal effect on sensitivity of the magnetic field transducer 21 prior to being transmitted to the central processor 50. In some embodiments, each magnetic field transducer 21 (e.g., AMR bridge) may be paired with its own dedicated sensor signal conditioning circuitry 25 (e.g., a Sensor Signal Conditioning ASIC) and the sensor signal conditioning circuitry 25 may digitally correct for the nominal offset of the input signal from the magnetic field transducer, the nominal sensitivity/gain of the input signal from the magnetic field transducer, how the offset of each magnetic field transducer changes over temperature and/or how the sensitivity/gain of each magnetic field transducer changes over temperature.

In some embodiments, the processing circuit 60 may then adjust the final output based on the combined signals received from the sensors in the active region. For example, the processing circuit 60 may compare the signals from the sensors in the active region (e.g., two adjacent sensors) to linearize the position output as a function of the two sensor readings (e.g., linearization algorithms such as a CORDIC algorithm or similar) which algorithms may be stored and executed in the central processing circuit. Thus, in some embodiments, the sensor signal conditioning circuitry 25 is configured to compensate for individual transducer error and the central processing circuit 60 is configured to compensate for apparatus error (e.g., non-linearity or position accuracy issues). For example, U.S. Pat. No. 6,097,183 describes methods for processing and adjusting signals of a position detection apparatus, which patent is hereby incorporated by reference in its entirety. In some embodiments, reference point data for the compensation and/or correction may be predefined (e.g., during manufacturing and/or assembly) and stored by the central processor 50, e.g., in memory device 55. In an instance in which a magnetic field or temperature is required to calibrate a sensor, this calibration may be done in an end-of-line (EOL) magnetic tester, for example. This configuration alleviates the need for the central processor 50 to have to compensate error data of all AMR sensors 20 in an array 24 in addition to determining position data of the magnet 12. Moreover, the individual processors 30 are able to more accurately compensate for the differences between transducers 21, which may be mathematically limited when such calculations are performed by a single, primary microprocessor. In this regard, all digital position data received at the central processor 50 from each AMR sensor 20 in the array 24 may already be individually converted and compensated and ready to be processed using one or more algorithms or instructions for determining a position of a magnet associated with the digital position data. Instead of digital position data from an array of AMR sensors 20 being multiplexed (e.g., by a discrete multiplexer) into a processor which in turn calculates and averages variations in gain and/or sensor offset of the AMR sensors together via an equation, digital position data may be compensated at each AMR sensor 20 individually, in parallel or near-parallel to each other, and subsequently provided to a central processor 50 for executing one or more digital positioning algorithms. As described herein, "near-parallel" may refer to signals which are input to the processing circuit 60 simultaneously regardless of whether such signals are addressed by the central processor 50 in parallel and/or series, such that the signals are made available to the processor in parallel, but the processor may, due to internal limitations or by choice, consider one or more of the signals in sequence.

This error compensation and/or correction by a single processor may at least somewhat reduce common mode gain variations such as sensitivity (e.g., span or gain) and/or offset in order to preserve the shape of the curve (e.g., the analog output of the magnetic field transducer 21) which may be fundamental to performance. However, for example, if magnetic field transducers 21 from two completely different wafer lots were to be paired side-by-side in the array 24, their output may comprise drastically different thermal coefficient of span values (e.g., an amount of span change occurring over a specified temperature change), and conventional methods of compensation at a central microprocessor would be insufficient, especially at extreme temperatures. In this regard, while two magnetic field transducers 21 may behave together in a particular manner at room temperature, this behavior may vary during operation under a full range of temperatures (e.g., extremely low or extremely high temperatures). In contrast, compensating each magnetic field transducer 21 for its own unique offset, sensitivity (e.g., span), thermal effect on offset and thermal effect on sensitivity may lead to improved performance. Moreover, in some embodiments, sensors using a single compensating processor for multiple sensors may be limited to determining a ratio between the signals rather than calculating an absolute output value from each sensor to avoid errors in the data caused by the aforementioned factors. In contrast, the various apparatus according to the present disclosure may generate absolute signal values which may be trusted for downstream computation.

After processing the digital position data, such as error compensation and/or correction of the digital position data as described above, the processor 30 of the AMR sensor 20 may be configured to transmit the processed digital position data to the processing circuit 60 and the central processor 50. In this regard, as described above, each AMR sensor 20 may be electrically connected (e.g., in electrical communication) with the central processor 50. For example, each AMR sensor 20 may be electrically connected to the central processor 50 via a respective conductor 28 and configured to transmit data, such as the processed digital position data, to the central processor 50, either directly or indirectly. In some embodiments, the digital position data may be may be provided at one or more digital output pins 29 of the AMR sensor 20 and the transmission of the processed digital position data from the AMR sensor 20 to the central processor 50 in accordance with a digital communication protocol as described above.

FIG. 4 illustrates an example overview of another sensor signal conditioning circuit 252 that may be configured in accordance with another embodiment. In an embodiment, for example, a sensor signal conditioning circuit may include a ZSSC3224 sensor signal conditioner manufactured by Renesas Electronics. As shown in FIG. 4, the sensor signal conditioning circuit 252 may include conversion circuitry 22 and a processor 30, and which may include one or more other components and modules, including a temperature reference sensor to allow compensation for temperature effects, an analog ground reference/command mode (AGND/CM) generator, a bias current generator, a voltage regulator, a pre-amplifier, a multiplexer for selecting the signal input to the pre-amplifier, which may be a signal received from a magnetic field transducer or the internal temperature reference sensor signals, a dynamic power-on reset circuit configured to achieve minimum current consumption during a sleep mode operation, a clock generator and oscillator, and a system control unit for controlling the conversion circuitry. In some embodiments, each of the foregoing modules, either alone or in combination with one or more other modules, may perform one or more pre-processing steps on the analog data upstream of the AD converter. In some embodiments, the processor 30 may be downstream of the AD converter. The embodiment of FIG. 4 illustrates that a multiplexer may still be used in some instances, such as to add additional signals for the signal conditioning processor to consider when processing the signals from each transducer. In some embodiments, there may not be a multiplexer between multiple sensor transducers 21 and the signals from each transducer 21 may be processed and input into the central processing circuitry 60 in parallel as described herein. In some embodiments, the system may not include any multiplexer.

In some embodiments, the position detection apparatus 100 may be supplied with current such that the position detection apparatus 100 is powered on. In some embodiments, the position detection apparatus 100 may be supplied with electrical current via one or more power supplies and/or the like.

In one embodiment, as described above, the array 24 of AMR sensors 20 and the central processor 50 may be supplied with electrical current at different voltages (e.g., from separate power supplies or via separate voltage outputs of a single power supply). For example, the AMR sensors 20 may be operated at an independent supply voltage from the central processor 50. For example, the overall position detection apparatus 100, including the processing circuit 60, may be supplied with a 12.0 VDC regulated supply (e.g., such as in automotive applications of the position detection apparatus), while AMR sensors 20 may be powered with a lower voltage such as, for example, with 1.8 VDC, thus significantly reducing the power consumption of the overall sensor. In an embodiment using a single AD converter, master microprocessor, and multiplexer between transducers, in order to maximize performance, the same reference voltage (e.g., 12.0 VDC) may be applied to both the bridges and the AD converter. In such embodiments, AMR bridges, the discrete multiplexer, and the discrete AD converter may be required to receive the same supply voltage (e.g., 12.0 VDC) due to potential metricity errors in the analog domain.

In some embodiments of the AMR sensor 20 described in present disclosure, the AMR sensors 20 do not require the same voltage as is supplied to the central processor 50 in order to function effectively. For example, this may be because the dedicated signal conditioning circuit for each transducer can convert the signal to digital prior to transmission to the central processor, which enables independent control of each transducer to determine the active region and manage the sensing operation while using a digital, voltage-independent signal from each sensor 20. The present embodiment would in effect separate the voltage dependency of the array of AMR sensors 20 from each other and from the central processor 50 and afford more flexibility in the overall design. In this regard, the sensor signal conditioning circuit 25 of each AMR sensor 20 may be a low-power sensor signal conditioning circuit. In other words, because each AMR sensor 20 is configured to produce a digital output (e.g., processed digital position data), the AMR sensors 20 may be supplied with a lower voltage level than the voltage level supplied to central processor 50. In embodiments in which multiple transducers share a common microprocessor and AD converter, each group of components is supplied with the same voltage level in order to prevent analog domain errors.

FIG. 5 depicts an example flow chart of operations performed by the position detection apparatus 100. At operation 501, the position detection apparatus 100 may comprise means, such as the processor 30, central processor 50, and/or the like, for determining if an AMR sensor is in an active region. For example, for an AMR sensor to be determined to be in an active region, the magnetic field transducer 21 of the AMR sensor 20 may be in proximity of a magnet 12, such that the magnetic field transducer 21 may be actively receiving magnetic field data. In this regard, the position detection apparatus 100 may comprise means, such as the processor 30, central processor 50, memory device 55, and/or the like, for determining if two or more sensors are in an active region. In some embodiments, determining if two or more sensors are in an active region may be based on predefined threshold criteria, such that if the output of a particular magnetic field transducer 21 satisfies all requirements of the predefined threshold criteria, that magnetic field transducer may be determined to be in an active region. For instance, an example set of criteria may include "when $S_i<0$ & $S_{i+1} \geq 0$" (Axial Mode) or $S_i \geq 0$ & $S_{i+1}<0$" (Radial Mode). In some embodiments, additional criteria may be utilized. For example, stray magnetic fields and/or unwanted ferrous material near the array 24 may cause erroneous signals to be generated that allow a particular AMR bridge not in the active region to have an output that may satisfy the minimum threshold criteria but not be as large of a signal as required. To prevent against such errors, additional criteria may be applied, e.g., to select a largest signal of any of magnetic field transducers 21 in the array 24 that satisfied the predefined threshold criteria. In some embodiments, when the magnet starts approaching one of the ends of the particular segment of the active pair, the central microprocessor 50 may "wake up" the next sensor 20 so the baton is ready to be handed off.

In methods utilizing a discrete multiplexer, AMR sensors may be serially polled to determine which pair of AMR sensors are in the active region. However, due to this serial probing methodology, a delay may be incurred in the initial response time of the sensor. Present embodiments herein using a dedicated sensor signal conditioning circuit 25 in each AMR sensor 20 provide for all of the AMR sensors in an array 24 to be polled much faster (e.g., in parallel or near-parallel) and significantly minimizes the time required to have a valid output at start up (e.g., warm up time).

Once two or more AMR sensors 20 in the active region are determined, at operation 502, the position detection apparatus 100 may comprise means, such as the processor 30, central processor 50, memory device 55, and/or the like, for powering down remaining AMR sensors 20 in the array 24 that are not in the active region. In some embodiments, powering down the AMR sensors 20 not in the active region may comprise completely powering down the AMR sensors 20 not in the active region such that no electrical current is supplied to the AMR sensors not in the active region. In another embodiment, powering down the AMR sensors 20 not in the active region may comprise causing the AMR sensors 20 not in the active region to enter an operational sleep mode to minimize overall power consumption of the AMR sensors not in the active region. In this regard, during the operational sleep mode, the one or more AMR sensors not in the active region may be supplied with limited and significantly reduced amount of electrical current such that the AMR sensor may not be fully operational, however will be faster to start up (e.g., no start up time may be required) than an AMR sensor 20 that is fully powered down. In embodiments comprising a dedicated sensor signal conditioning circuit 25 with a separate processor 30 for each transducer 21, each sensor 20 and transducer 21 may be independently put into the sleep state or fully-powered-down state and independently awakened by the central processor 50, thus maximizing the power efficiency of the apparatus 100.

In some embodiments, the determination of a fully powered down state and/or operational sleep mode for the AMR sensors 20 not in an active region may be based on a response time of the AMR sensor and power consumption for the particular application. For example, in an application comprising a slow-moving magnet 12 in which the magnet does not change position often or changes position at a slow rate, operational sleep mode may be unnecessary and a fully powered down state of AMR sensors 20 not in an active region may provide reduced power consumption by the position detection apparatus 100. In some embodiments, the nature of the sleep and/or powered down mode of each sensor 20 may be predetermined. In some embodiments, the nature of the sleep and/or powered down mode of each sensor 20 may be calculated by the processor 50.

FIG. 6 depicts a flow chart of example operations further performed by the sensors 20 of the position detection apparatus 100. At operation 601, the position detection apparatus 100 may comprise means, such as conversion circuitry 22 and/or the like, for converting the output signal of each magnetic field transducer 21 in the active region to digital position data. For example, as described above, each transducer 21 of a respective AMR sensor 20 in the active region may receive magnetic field data (e.g., an analog signal) when magnet 12 is in proximity to the AMR sensor 20 and may be configured to provide an output signal based on the received magnetic field data. In this regard, the conversion circuitry 22 of the respective AMR sensor 20 may be configured to receive the output signal from the transducer 21 and convert the output signal into digital position data. In some embodiments, the conversion circuitry 22 of a particular AMR sensor 20 may be configured to transmit the digital position data to a processor 30 of the particular AMR sensor 20.

At operation 602, the position detection apparatus 100 may comprise means, such as processors 30 and/or the like, for processing and correcting the digital position data. In some embodiments, as described above, processing the digital position data may comprise compensating and/or correcting errors of the digital position data. In this regard, each AMR sensor 20 in the active region may comprise a processor 30 configured to process the digital position data received from the respective conversion circuitry 22 of the respective AMR sensor 20 in order to generate processed digital position data. At operation 603, the position detection apparatus 100 may comprise means, such as processors 30, communication interface 206 and/or the like, for transmitting the processed digital position data to a central processor 50. As described above, in some embodiments, the processed digital position data may be transmitted (e.g., via conductors 28) to the central processor 50 in accordance with a digital communication protocol such as SPI, I2C, and/or the like.

FIG. 7 depicts a flow chart of example operations performed by the processing circuit 60 of the position detection apparatus 100. At operation 701, the position detection apparatus 100 may comprise means, such as central processor 50, communication interface 206, and/or the like, for receiving processed digital data. In an embodiment, the central processor 50 may receive processed digital data from at least each AMR sensor 20 in the active region. At operation 702, the position detection apparatus 100 may comprise means, such as central processor 50 and/or the like, for determining a position of the magnet 12 based on the received processed digital position data. For example, the central processor 50 may comprise one or more algorithms (e.g., CORDIC algorithms and/or the like) and/or instructions (e.g., program code) and may be configured to execute the algorithms and instructions in accordance with the received processed digital position data. The algorithms may be configured to linearize the mathematical expression of the two sensor signals in the active region to produce a linear position output (e.g., A/(A-B)). In some embodiments, determining the position of the magnet comprises comparing signals received from at least two AMR sensors 20. In an embodiment, comparing signals received from at least two AMR sensors comprises comparing the processed digital position data received from each of the AMR sensors to determine a position of the magnet 12.

FIG. 8 depicts a flow chart of example operations performed in a method for position detection. At operation 801, the method comprises arranging a plurality of anisotropic magnetoresistive (AMR) sensors in an array. As described above, each AMR sensor may comprise a magnetic field transducer comprising magnetoresistive material (e.g., a Wheatstone bridge). The magnetic field transducer may be configured to provide an output signal based on an interaction between the magnetic field transducer and a magnet. Each AMR sensor may further comprise a sensor signal conditioning circuit configured to receive the output signal.

At operation 802, the method comprises providing a central processor in electrical communication with each anisotropic magnetoresistive sensor. As described above, in some embodiments, the central processor 50 may be configured to compare signals received from at least two of the plurality of AMR sensors to determine a position of the magnet. At operation 804, the method comprises passing a magnet by one or more of the anisotropic magnetoresistive sensors to cause transducers in the sensors to generate analog magnetic data.

Another advantage that may be achieved by the method and apparatus described herein includes a significant increase in resolution. In conventional methods, a discrete 16-bit AD converter may be shared among an entire array of AMR bridges. For example, in conventional methods, if eight (8) AMR bridges were utilized in conjunction with one (1) AD converter, seven segments (e.g., a pairing of two (2) bridges) would be divided out from $2^{16}$ counts, or, approximately 9,362 counts per segment (e.g., over 13 bits). However, in present embodiments discussed herein, by pairing conversion circuitry (e.g., a 16-bit AD converter) with each AMR sensor, this configuration may provide for over 3 bits additional resolution of each segment.

As described above, position detection apparatus, method, and system are disclosed for determining a position of a magnet by utilizing a dedicated sensor signal conditioning circuit for each anisotropic magnetoresistive (AMR) sensor in an array. By way of the improved apparatus, methods, and systems described herein, a faster and more efficient approach to position detection is provided. As described above, benefits of this design include reduced warmup time, faster response time, reduced power consumption, significantly increased output resolution of the AMR sensor array, and updating and/or polling of the AMR sensors in or near parallel. In some embodiments, embodiments of the present disclosure may be more cost effective, for example, because response time and resolution can be relaxed while maintaining the same performance as traditional sensors.

FIGS. 5-8 illustrate flowcharts depicting methods according to an example embodiment of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 55 of an apparatus employing an embodiment of the present invention and executed by a processor 30, 50. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodi- That which is claimed:

1. A position detection apparatus comprising:
    a plurality of anisotropic magnetoresistive sensors arranged in an array, wherein each anisotropic magnetoresistive sensor comprises:
        a magnetic field transducer comprising magnetoresistive material, the magnetic field transducer configured to provide an output signal based on an interaction between the magnetic field transducer and a magnet; and
        a sensor signal conditioning circuit comprising a converter and a processor, the sensor signal conditioning unit configured to receive the output signal and generate processed digital position data; and
    a central processor in electrical communication with each anisotropic magnetoresistive sensor, wherein the plurality of anisotropic magnetoresistive sensors and the central processor are configured to be electrically powered at different operating voltages, wherein the central processor is configured to:
        periodically scan the output of each anisotropic magnetoresistive sensor to obtain the processed digital position data;
        receive and compare the processed digital position data from at least two of the plurality of anisotropic magnetoresistive sensors to determine a position of the magnet, and
        power down one or more anisotropic magnetoresistive sensors of the plurality of anisotropic magnetoresistive sensors, wherein the one or more anisotropic magnetoresistive sensors are in an inactive region of the plurality of anisotropic magnetoresistive sensors determined to be farther from the magnet than one or more other anisotropic magnetoresistive sensors of the plurality of anisotropic magnetoresistive sensors.

2. The position detection apparatus of claim 1, wherein each sensor signal conditioning circuit comprises the processor configured to process the digital position data to generate the processed digital position data.

3. The position detection apparatus of claim 1, wherein the digital position data comprises errors associated with at least one of an offset error, a sensitivity error, a thermal effect on offset error, or a thermal effect on sensitivity error.

4. The position detection apparatus of claim 3, wherein processing the digital position data comprises compensation of one or more of the errors.

5. The position detection apparatus of claim 1, wherein the array is configured on a printed circuit board (PCB).

6. The position detection apparatus of claim 1, wherein the plurality of anisotropic magnetoresistive sensors are configured to be electrically powered at a lower operating voltage than the operating voltage of the central processor.

7. The position detection apparatus of claim 1, wherein no multiplexer is present between the plurality of anisotropic magnetoresistive sensors and the central processor, and wherein the central processor is configured to address the plurality of anisotropic magnetoresistive sensors in parallel or near parallel.

8. The position detection apparatus of claim 1, wherein the magnetic field transducer comprises a Wheatstone bridge circuit.

9. The position detection apparatus of claim 1, wherein the converter is configured to convert the received output signal into digital position data before generating the processed digital position data, and the processor is configured to process the digital position data to generate the processed digital position data.

10. A method of position detection, comprising:
    arranging a plurality of anisotropic magnetoresistive sensors in an array, wherein each anisotropic magnetoresistive sensor comprises:
        a magnetic field transducer comprising magnetoresistive material, the magnetic field transducer configured to provide an output signal based on an interaction between the magnetic field transducer and a magnet; and
        a sensor signal conditioning circuit comprising a converter and a processor, the sensor signal conditioning unit configured to receive the output signal and generate processed digital position data;
    providing a central processor in electrical communication with each anisotropic magnetoresistive sensor, wherein the plurality of anisotropic magnetoresistive sensors are configured to be electrically powered at a lower operating voltage than the operating voltage of the central processor, and wherein the central processor is configured to:
        periodically scan the output of each anisotropic magnetoresistive sensor to obtain the processed digital position data;
        receive and compare the processed digital position data from at least two of the plurality of anisotropic magnetoresistive sensors to determine a position of the magnet, and
        power down one or more anisotropic magnetoresistive sensors of the plurality of anisotropic magnetoresistive sensors, wherein the one or more anisotropic magnetoresistive sensors are in an inactive region of the plurality of anisotropic magnetoresistive sensors determined to be farther from the magnet than one or more other anisotropic magnetoresistive sensors of the plurality of anisotropic magnetoresistive sensors.

11. The method of claim 10, wherein each sensor signal conditioning circuit comprises the converter configured to convert the received output signal into digital position data before generating the processed digital position data.

12. The method of claim 11, wherein each sensor signal conditioning circuit comprises the processor configured to process the digital position data to generate the processed digital position data.

13. The method of claim 12, wherein the digital position data comprises errors associated with at least one of an offset error, a sensitivity error, a thermal effect on offset error, or a thermal effect on sensitivity error.

14. The method of claim 13, wherein processing the digital position data comprises compensation of one or more of the errors.

15. The method of claim 10, wherein the plurality of anisotropic magnetoresistive sensors and the central processor are configured to be electrically powered at different operating voltages.

16. The method of claim 10, wherein no multiplexer is present between the plurality of anisotropic magnetoresistive sensors and the central processor, and wherein the central processor is configured to address the plurality of anisotropic magnetoresistive sensors in parallel or near parallel.

17. The method apparatus of claim 10, wherein the magnetic field transducer comprises a Wheatstone bridge circuit.

18. The method of claim 10, wherein the converter is configured to convert the received output signal into digital position data before generating the processed digital position data, and the processor is configured to process the digital position data to generate the processed digital position data.

* * * * *